United States Patent
Husson et al.

(10) Patent No.: US 8,372,293 B2
(45) Date of Patent: Feb. 12, 2013

(54) METHOD FOR PRODUCING AQUEOUS SUSPENSIONS OF MINERAL FILLERS, THE THUS OBTAINED AQUEOUS SUSPENSIONS OF MINERAL FILLERS AND THE USE THEREOF

(75) Inventors: Maurice Husson, Chalons en Champagne (FR); Christian Jacquemet, Lyons (FR); Eugène Vorobiev, Compiègne (FR)

(73) Assignee: Omya Development AG, Oftringen (CH)

( * ) Notice: Subject to any disclaimer, the term of this patent is extended or adjusted under 35 U.S.C. 154(b) by 0 days.

(21) Appl. No.: 10/520,471

(22) PCT Filed: Jul. 16, 2003

(86) PCT No.: PCT/FR03/02254
§ 371 (c)(1),
(2), (4) Date: Jan. 7, 2005

(87) PCT Pub. No.: WO2004/012849
PCT Pub. Date: Feb. 12, 2004

(65) Prior Publication Data
US 2005/0249759 A1 Nov. 10, 2005

(30) Foreign Application Priority Data
Jul. 17, 2002 (FR) ..................... 02 09015

(51) Int. Cl.
*B01D 37/00* (2006.01)
*B01D 37/02* (2006.01)
*B01D 37/03* (2006.01)
*B01D 37/04* (2006.01)
*A61K 33/08* (2006.01)
*A61K 33/10* (2006.01)
*C09D 11/00* (2006.01)
*A01N 59/06* (2006.01)

(52) U.S. Cl. ........ 210/768; 424/687; 424/688; 424/690; 106/31.57; 106/31.9

(58) Field of Classification Search .................... 424/687
See application file for complete search history.

(56) References Cited

U.S. PATENT DOCUMENTS

| 3,970,629 | A | * | 7/1976 | Izaki et al. ................. 524/26 |
| 4,166,582 | A | | 9/1979 | Falcon-Steward |
| 4,175,066 | A | * | 11/1979 | Shibazaki et al. .......... 524/425 |
| 4,383,936 | A | | 5/1983 | Franz et al. |
| 4,793,985 | A | | 12/1988 | Price et al. |
| 4,962,279 | A | | 10/1990 | Anderson et al. |
| 5,833,747 | A | * | 11/1998 | Bleakley et al. ............ 106/464 |
| 6,376,168 | B1 | | 4/2002 | Kawanishi |

FOREIGN PATENT DOCUMENTS

| EP | 0 850 685 A2 | 1/1998 |
| EP | 1 160 201 A2 | 5/2001 |
| GB | 1463974 A | 2/1977 |
| GB | 1482258 A | 8/1977 |
| JP | 53025646 A | 2/1978 |
| JP | 2001011081 A | 1/2001 |
| JP | 2002-194263 | 10/2002 |
| WO | WO 95/11736 | 5/1995 |
| WO | WO 95/25146 | 9/1995 |
| WO | WO 97/38940 | 10/1997 |
| WO | WO 98/25854 | 6/1998 |
| WO | WO 00/39029 | 7/2000 |

OTHER PUBLICATIONS

The Notice of Opposition dated Jan. 27, 2009, for European Application No. 03750812.4, which is the European equivalent to the subject application.
Patentee's Oct. 27, 2009 Response to the Opposition of European Application No. 03750812.4, which is the European equivalent to the subject application.

* cited by examiner

*Primary Examiner* — Ernst Arnold
(74) *Attorney, Agent, or Firm* — Amster, Rothstein & Ebenstein LLP

(57) ABSTRACT

The invention concerns a process for the preparation of aqueous suspensions of fluid mineral matter, which are able to be pumped and conveyed by the end user immediately after the filtration stage, possibly followed by a compression, which process comprises filtration in two separate stages.
The invention also concerns aqueous suspensions of mineral matter obtained and their uses.

21 Claims, 1 Drawing Sheet

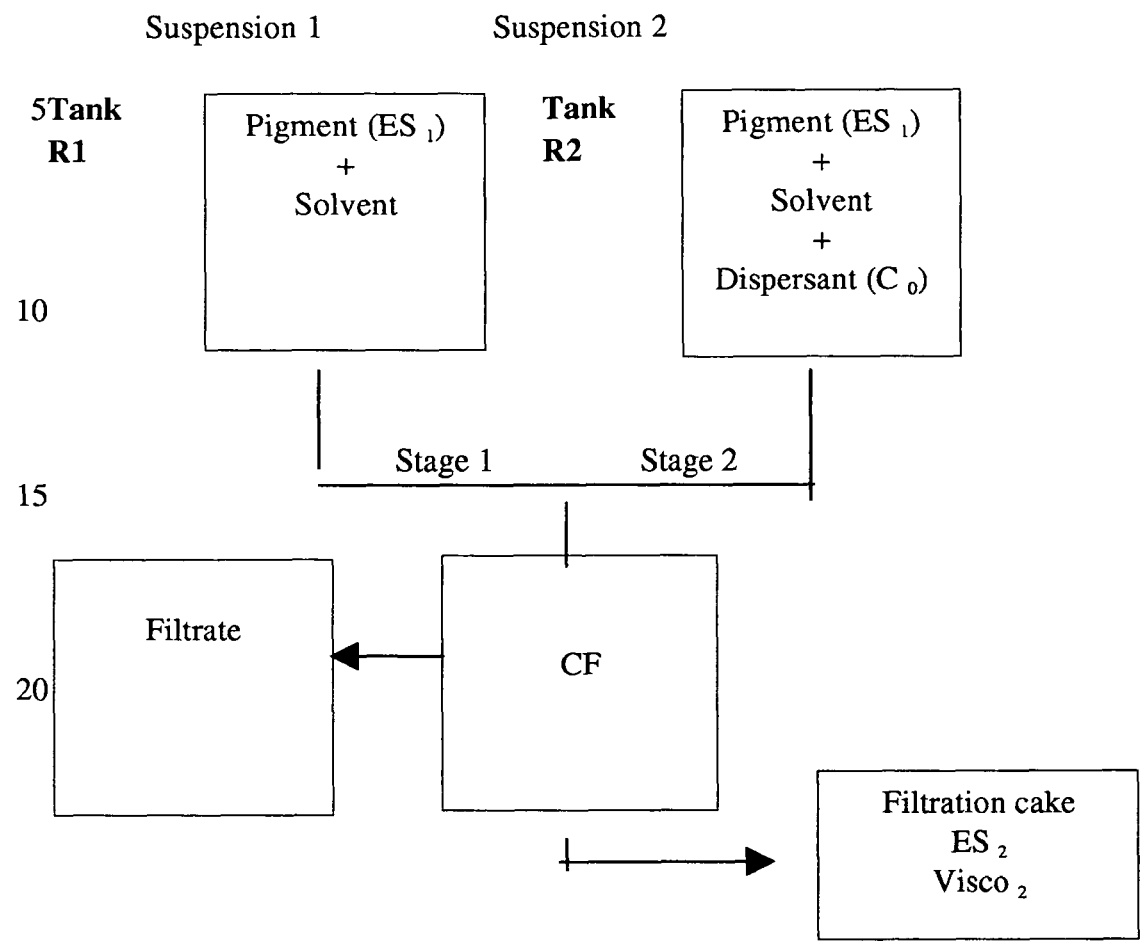

METHOD FOR PRODUCING AQUEOUS SUSPENSIONS OF MINERAL FILLERS, THE THUS OBTAINED AQUEOUS SUSPENSIONS OF MINERAL FILLERS AND THE USE THEREOF

The present invention concerns the technical sector of mineral loads, such as notably the paper production field and in particular paper coating and mass-loading of paper, or the fields of paint, water treatment such as notably the field of purification muds, detergency, ceramics, cements or hydraulic binders, public works, inks and varnishes, gluing of textiles or any type of industry requiring the use of concentrated pigment suspensions, and concerns more particularly the fields of paper, water treatment, paint and ceramics.

In a more particular manner, the invention concerns a process for preparation of aqueous suspensions of mineral loads or pigments with a satisfactory rheology used in the various abovementioned fields.

To accomplish the industrial applications in the above fields, it is necessary to produce suspensions of mineral loads, notably calcium carbonates, with an excellent rheology, i.e. with a low viscosity during the period of storage to facilitate manipulating and application of them, and as high as possible a mineral matter content, in order to reduce the quantity of water handled.

During production of these aqueous suspensions of mineral loads satisfying the abovementioned criteria, some processes lead to weakly concentrated aqueous suspensions of mineral or organic matter.

These suspensions must then be concentrated to offer them to the end user who use the aqueous suspensions or to eliminate the solvents present when these loads are used in a powder form.

One of the means known currently is to concentrate these suspensions by a filtration process, but these filtrations have until the present day led to cakes which are so compact that it is necessary firstly to add the dispersant after the filtration stage and secondly to use a high mechanical energy to return them to suspension or convey the concentrated suspensions.

Thus, patent application WO 00/39029 teaches those skilled in the art that a process to prepare an aqueous suspension of calcium carbonate consists in following the filtration stage with a thermal concentration stage and then with a stage of use of mechanical energy to return the mineral particles to suspension, with the addition of dispersant after the filtration stage.

Faced with this problem of additional use of a dispersant agent or use of high mechanical energy, the Applicant then found, in a surprising fashion, that as claimed in the invention the process for preparing aqueous suspensions of mineral matter characterised by a filtration in two separate stages enables the problem to be resolved and thus an aqueous suspension of mineral matter to be obtained which is directly useable after the filtration stage, possibly followed by a compression, without any obligation to implement an additional stage such as the addition of a dispersant agent after the concentration stage, or the use of mechanical energy to return the mineral matter to suspension.

Thus, the filtering of suspensions not containing any dispersant is known (Solid-liquid filtration and separation technology, A. Rushton, A. S. Ward, R. G. Holdich, 1996; Filtration: Equipment selection Modelling and process simulation, R. J. Wakeman, E. S. Tarleton, 1999; Practice of filtration, J. P. Duroudier, 1999), but the disadvantage is that cakes which are produced are difficult to re-disperse.

A process involving the introduction, into an aqueous suspension of calcium carbonate, of half the quantity of dispersant before filtering the said suspension, and the addition of the other half after the filtration stage, is also known (JP 53-025646) in order to obtain a highly concentrated suspension of calcium carbonate.

Those skilled in the art are also familiar with another document (GB 1 482 258) which reveals a process for the preparation of aqueous suspensions of precipitated calcium carbonate (PCC) using a dispersant before the stage of concentration by a filtration in a single stage, but this process has two major disadvantages.

The first consists of the need to use a pressure of over 17 bars to be able to filter and of the obligation to use very particular dispersive facilities to disperse the cake obtained.

The second disadvantage of the said method lies in the fact that large quantities of dispersant are found in the filtrate, which generates environmental and ecological problems, and industrial wastes treatment problems or problems of recirculation of the water used in the remainder of the process, and which also generates cost problems given the large quantities of dispersant used.

Similarly, patent GB 1 463 974 describes a method for filtration in a single stage leading to the same disadvantages as those mentioned above.

Thus, the techniques known to those skilled in the art lead them to use the dispersant agent either in full after the filtration, or half before the filtration stage and the other half after the filtration stage, or again in using the dispersant agent before the filtration stage but with the need to use firstly a large quantity of dispersant agent generating the abovementioned disadvantages, and secondly a very particular dispersive facility.

Generally, all these techniques known on today's date have the disadvantage that they result in great difficulty in returning the cake to suspension if it is desired to obtain highly concentrated suspensions of dry matter having a satisfactory rheology.

Thus, one of the aims of the invention is to offer a process for preparing aqueous suspensions of loads and/or mineral pigments with a satisfactory rheology, i.e. to offer a process for preparing fluid aqueous suspensions of mineral matter, which are able to be pumped and able to be conveyed by the end user immediately after the filtration stage, possibly followed by a compression, using small quantities of dispersant, and allowing a check of the quantities of dispersant present in the filtrate with a view to obtaining near-zero quantities of dispersant present in the filtrate.

Near-zero quantities of dispersant present in the filtrate means that the end of the second stage corresponds to the appearance of the dispersant in the filtrate. This appearance of dispersant in the filtrate is quantified by a measurement of electrical conductivity.

This process of preparing, as claimed in the invention, aqueous suspensions of fluid mineral matter, able to be pumped and able to be conveyed by the end user immediately after the filtration stage, with small quantities of dispersant used, and allowing control of the quantities of dispersant present in the filtrate, is characterised by the fact that it comprises a filtration in two separate stages, possibly followed by a compression.

In a more particular manner, these two separate stages of filtration consist of a first stage in which a pre-layer is formed using no dispersant agent, followed by a second stage continuous with the first in the presence of one or more dispersant agents, and in an even more particular manner followed by a second filtration stage containing 0.01% to 10%, preferentially 0.1% to 2% by dry weight of dispersant relative to the dry weight of the mineral matter to be filtered.

When this pre-layer has been formed, the water of the pre-layer is replaced, in the second stage, by the water of the second stage containing one or more dispersant agents such that the dispersant or dispersants are spread uniformly throughout the whole of the filtration cake.

It should be noted that during the entire filtration period the pressure applied has a value of around that commonly used in the traditional filtration processes. In an even more particular manner, this process as claimed in the invention is characterised in that the quantity of dispersant agent present in the filtrate is controlled and limited by a continuous measurement of electrical conductivity of the filtrate and in that the filtration stage is stopped as soon as the electrical conductivity of the filtrate increases. This stoppage of filtration at the time when the electrical conductivity increases corresponds to a near-zero quantity of dispersant present in the filtrate.

Thus, the process as claimed in the invention enables aqueous suspensions of fluid mineral matter to be obtained directly, which are able to be pumped and able to be conveyed immediately after the filtration stage, possibly followed by a compression, using small quantities of dispersant and with near-zero quantities of dispersant present in the filtrate.

To do so, the dispersant agent or agents used are chosen either from the dispersants commonly used in the field of suspension of mineral loads such as, for example, polyphosphates, polyacrylates, whether functionalised or not, or any other polymer with a dispersant function, or from the anionic, cationic, non-ionic or zwitterionic surface active agents.

The process of preparing aqueous suspensions of mineral matter as claimed in the invention is characterised in that the mineral matter may be chosen from natural calcium carbonate including notably the various chalks, calcites or marbles, or chosen from the synthetic calcium carbonates such as precipitated calcium carbonates at different stages of crystallisation, or from the mixed magnesium and calcium carbonates such as dolomites, or from magnesium carbonate, zinc carbonate, lime, magnesia, barium sufphate such as barita, calcium sulphate, silica, the magnesio-silicates such as talc, wollastonite, clays and other alumino-silicates such as kaolins, mica, metal or alkaline earth oxides or hydroxides such as magnesium hydroxide, iron oxides, zinc oxides, titanium oxides, titanium dioxides in its anatase or rutile forms, and mixtures of them such as, notably, mixtures of talc and calcium carbonate.

Preferentially, the mineral matter is chosen from natural calcium carbonate, synthetic calcium carbonate also called precipitated calcium carbonate, titanium dioxide in its anatase or rutile forms, kaolin, aluminium hydroxide, clays or their mixtures.

An additional aim of the invention is to develop an aqueous suspension of mineral matter which is fluid, able to be pumped and conveyed by the end user immediately after the filtration stage, possibly followed by a compression.

This aqueous suspension of mineral matter as claimed in the invention is characterised in that it contains 0.01% to 10%, preferentially 0.1% to 2% by dry weight of dispersant relative to the dry weight of mineral matter to be filtered, and in that it is obtained by the process as claimed in the invention.

In a more particular manner, it is characterised in that the mineral matter may be chosen from among natural calcium carbonate, including notably the various chalks, calcites, marbles or again chosen from the synthetic calcium carbonates such as precipitated calcium carbonates at different stages of crystallisation, or again from the mixed carbonates of magnesium and calcium such as the dolomites, or from magnesium carbonate, zinc carbonate, lime, magnesia, barium sulphate such as barita, calcium sulphate, silica, magnesio-silicates such as talc, wollastonite, clays and other alumino-silicates such as kaolins, mica, metal or alkaline-earth oxides or hydroxides such as magnesium hydroxide, iron oxides, zinc oxides, titanium oxides, titanium dioxides in its anatase or rutile forms, and mixtures of them such as, notably, mixtures of talc and calcium carbonate.

Finally, another aim of the invention concerns the use of aqueous suspensions as claimed in the invention in the fields of paper, paint, water treatment such a notably the field of purification muds, detergency, ceramics, cements or hydraulic binders, public works, inks and varnishes, gluing of textiles or any type of industry requiring the use of concentrated pigment suspensions, and concerns more particularly the use of aqueous suspensions as claimed in the invention in the fields of paper, water treatment, paint and ceramics.

The scope and interest of the invention will be better perceived thanks to the following examples which cannot be restrictive.

EXAMPLE 1

This example illustrates the invention and concerns the filtration of an aqueous suspension of natural calcium carbonate and more particularly of a Champagne chalk of median diameter 2 micrometers.

To accomplish this, 286.8 grams of the chalk suspension is used with a dry matter concentration equal to 20.3% and, as filtration equipment, an item of laboratory equipment of the company CHOQUENET consisting:
of a polypropylene frame with a chamber 2.2 cm wide and with a section of 25 cm$^2$
of two steel plates, one of which fixed, with flutes on the inner face, by which the filtrate is collected,
of two joints which provide sealing between the plates and the frame,
of two polypropylene filtrating membranes from the company SEFAR FYLTIS (ref.: F 0149 AN)

The filtration chamber (CF) can be supplied successively by a tank R1 containing the suspension of the pigment to be concentrated, and then by a second tank R2 containing the same suspension as before, to which will be added a quantity of dispersant Co required to obtain a concentrated cake ($ES_2$), and which can easily be removed, i.e. a cake with a sufficient consistency to be removed from the filtration chamber in a single element. Another alternative consists in R2 containing only a dispersant solution.

The filtration process proper is conducted in two separate stages (see diagram 1):
1/during a first stage, a pre-layer from suspension 1 is formed on the filtrating membranes,
2/followed by a second stage, in which filtration is undertaken from suspension 2 containing the dispersant.

In the second stage, the water contained in the pre-layer is replaced by water loaded with dispersant contained in suspension 2, such that at the end of the filtration stage the dispersant is spread uniformly throughout the entire filtration cake.

Each of the filtration stages is undertaken under a 5 bar pressure.

The filtration stage is followed by a compression stage under a pressure of 15 bars, and enables a filtration cake of dryness $ES_2$ to be obtained.

The filtration cake is then subjected to a weak shearing to obtain a suspension also called fluid "slurry".

This stage is undertaken using a standard laboratory mechanical agitator of type RAYNERI filled with an adapted blade. When the suspension is homogeneous, we measure its viscosity (visco 2) using a Brookfield™ viscometer of the RVT type fitted with an adapted module.

The suspension as claimed in the invention, obtained by the process as claimed in the invention described above and using 0.2% by dry weight, relative to the dry weight of dry chalk, of an ammonium polyacrylate of molecular weight by weight equal to 4,500 g/mole, is then an aqueous suspension of chalk with a dry matter concentration of 76.8% and a Brookfield™ viscosity of 2,900 mPa·s measured at 10 revolutions per minute and of 518 mPa·s measured at 100 revolutions per minute.

The filtration stage is stopped when the electrical conductivity of the filtrate measured using an HI 8820N conductivity meter from Hanna Instruments (Portugal) increases, i.e. after having collected 170.6 grams of filtrate. The content of dispersant in the filtrate is then near-zero.

The suspension thus obtained is fluid, and able to be pumped and conveyed by the end user immediately after the filtration stage.

After 8 days' storage of the suspension as claimed in the invention, a new measurement of Brookfield™ viscosity is taken after agitating the flask containing the said suspension. A Brookfield™ viscosity is then obtained of 3,770 mPa·s measured at 10 revolutions per minute and of 645 mPa·s measured at 100 revolutions per minute, showing that the suspension obtained is fluid, and able to be pumped and conveyed, even after eight days' storage.

EXAMPLE 2

This example illustrates the invention and concerns the filtration of an aqueous suspension of natural calcium carbonate and more particularly of a marble of median diameter of 0.75 micrometer.

To accomplish this, with the same operating method and the same equipment as in example 1, firstly 173.2 grams of the aqueous suspension of marble is used, the dry matter concentration of which is 27.6% and secondly 0.5% by dry weight, relative to the dry weight of marble, of a sodium polyacrylate called Coatex DV 834, to obtain directly an aqueous suspension of marble the dry matter concentration of which is 72.1%, and the Brookfield™ viscosity of which is 635 mPa·s measured at 10 revolutions per minute and 240 mPa·s measured at 100 revolutions per minute.

The filtration stage is stopped when the electrical conductivity of the filtrate measured using an HI 8820N conductivity meter from Hanna Instruments (Portugal) increases, i.e. after having collected 114.5 grams of filtrate. The dispersant content in the filtrate is near-zero.

The suspension thus obtained is fluid, and able to be pumped and conveyed by the end user immediately after the filtration stage.

After storage of 8 days of the suspension as claimed in the invention, a new Brookfield™ viscosity measurement is undertaken after agitating the flask containing the said suspension. A Brookfield™ viscosity is then obtained of 1,930 mPa·s measured at 10 revolutions per minute and of 550 mPa·s measured at 100 revolutions per minute, showing that the suspension obtained is fluid, and able to be pumped and conveyed, even after eight days' storage.

EXAMPLE 3

This example illustrates the invention and concerns the filtration of an aqueous suspension of precipitated calcium carbonate (PCC) of median diameter 0.9 micrometer.

To accomplish this, with the same operating method and the same equipment as in example 1, firstly 156 grams of the aqueous suspension of PCC is used, the dry matter concentration of which is 24% and moreover 1.0% by dry weight, relative to the dry weight of PCC, of a sodium polyacrylate of molecular weight by weight equal to 10,000 g/mole, to obtain directly an aqueous suspension of PCC the dry matter concentration of which is 65.9% and the Brookfield™ viscosity of which is 4570 mPa·s measured at 10 revolutions per minute and 930 mPa·s measured at 100 revolutions per minute.

The filtration stage is stopped when the electrical conductivity of the filtrate measured using an HI 8820N conductivity meter from Hanna Instruments (Portugal) increases, i.e. after having collected 123.7 grams of filtrate. The dispersant content in the filtrate is then near-zero.

The suspension thus obtained is fluid, and able to be pumped and conveyed by the end user immediately after the filtration stage.

EXAMPLE 4

This example illustrates the invention and concerns the filtration of an aqueous suspension of natural calcium carbonate and more particularly of a marble of median diameter 0.6 micrometer.

To accomplish this, with the same operating method and the same equipment as in example 1, firstly 226.4 grams of the aqueous suspension of marble is used, the dry matter concentration of which is 20.9%, and moreover 1.0% by dry weight, relative to the dry weight of marble, of a sodium polyacrylate called Coatex DV 834, to obtain directly an aqueous suspension of marble the dry matter concentration of which is 70.0%, and the Brookfield™ viscosity of which is 1,500 mPa·s measured at 10 revolutions per minute and 670 mPa·s measured at 100 revolutions per minute.

The filtration stage is stopped when the electrical conductivity of the filtrate measured using an HI 8820N conductivity meter from Hanna Instruments (Portugal) increases, i.e. after having collected 177.7 grams of filtrate. The content of dispersant in the filtrate is then near-zero.

The suspension thus obtained is fluid, and able to be pumped and conveyed by the end user immediately after the filtration stage.

After 8 days' storage of the suspension as claimed in the invention, a new measurement of the Brookfield™ viscosity is taken after agitating the flask containing the said suspension. A Brookfield™ viscosity is then obtained of 1,840 mPa·s measured at 10 revolutions per minute and of 750 mPa·s measured at 100 revolutions per minute, showing that the suspension obtained is fluid, and able to be pumped and conveyed, even after eight days' storage.

EXAMPLE 5

This example illustrates the invention and concerns the filtration of an aqueous suspension of titanium dioxide sold by the company Element is under the name RHD2.

To accomplish this, with the same operating method and the same equipment as in example 1, firstly 390.9 grams of the aqueous suspension of titanium dioxide is used, the dry matter concentration of which is 24.2%, and moreover 0.3% by dry weight, relative to the dry weight of titanium dioxide, of a copolymer sold by the company Coatex under the name Coatex BR3, to obtain directly an aqueous suspension of titanium dioxide, the dry matter concentration of which is 74.2%, and the Brookfield™ viscosity of which is 1,100 mPa·s measured at 10 revolutions per minute and 460 mPa·s measured at 100 revolutions per minute.

The filtration stage is stopped when the electrical conductivity of the filtrate measured using an HI 8820N conductivity meter from Hanna Instruments (Portugal) increases, i.e. after having collected 288.5 grams of filtrate. The dispersant content in the filtrate is then near-zero.

The suspension thus obtained is fluid, and able to be pumped and conveyed by the end user immediately after the filtration stage. It is also advantageously used in the paint field.

EXAMPLE 6

This example illustrates the invention and concerns the filtration of an aqueous suspension of kaolin sold by the company Imerys under the name SPS.

To accomplish this, with the same operating method and the same equipment as in example 1 are used, firstly 229.1 grams of the aqueous suspension of kaolin is used, the dry matter concentration of which is 23.9%, and moreover 0.2% by dry weight, relative to the dry weight of kaolin, of a sodium polyacrylate of molecular weight by weight equal to 4,500 g/mole, to obtain directly an aqueous solution of kaolin the dry matter concentration of which is 68.0%, and the Brookfield™ viscosity of which is 1,590 mPa·s measured at 10 revolutions per minute and 655 mPa·s measured at 100 revolutions per minute.

The filtration stage is stopped when the electrical conductivity of the filtrate measured using an HI 8820N conductivity meter from Hanna Instruments (Portugal) increases, i.e. after having collected 167.7 grams of filtrate. The dispersant content in the filtrate is then near-zero.

The suspension thus obtained is fluid, and able to be pumped and conveyed by the end user immediately after the filtration stage.

EXAMPLE 7

This example illustrates the invention and concerns the filtration of an aqueous solution of aluminium hydroxide sold by the company Martinswerk under the name OL 104.

To accomplish this, with the same operating method and the same equipment as in example 1, firstly 201.0 grams of the aqueous suspension of aluminium hydroxide is used, the dry matter concentration of which is 25.3%, and moreover 0.25% by dry weight, relative to the dry weight of aluminium hydroxide, of a copolymer of molecular weight by weight equal to 3,500 g/mole, and consisting of acrylic acid and of methoxy-polyethylene glycol methacrylate of molecular weight 2,000, having been completely neutralised using soda, to obtain directly an aqueous suspension of aluminium hydroxide, the dry matter concentration of which is 71.8%, and the Brookfield™ viscosity of which is 230 mPa·s measured at 10 revolutions per minute and 230 mPa·s measured at 100 revolutions per minute.

The filtration stage is stopped when the electrical conductivity of the filtrate measured using an HI 8820N conductivity meter from Hanna Instruments (Portugal) increases, i.e. after having collected 144.2 grams of filtrate. The dispersant content in the filtrate is then near-zero.

The suspension thus obtained is fluid, and able to be pumped and conveyed by the end user immediately after the filtration stage.

EXAMPLE 8

This example concerns the use of an aqueous solution of mineral load as claimed in the invention in the paper field, and more particularly concerns the measurement of the optical properties of the suspension of example 4 obtained as claimed in the invention, and more particularly the determination of the value of the capacity for diffusion of the visible light of the aqueous suspension of example 4, together with the intrinsic brilliancy values of the pigment obtained by filtration.

This capacity for diffusion of visible light is expressed by a light scattering factor S which is the Kubelka-Munk factor for diffusion of light, determined by the method well known to those skilled in the art described in the publications of Kubelka and Munk (Zeitschrift für Technische Physik 12, 539, (1931)), of Kubelka (J. Optical Soc. Am. 38(5), 448, (1948) and J. Optical Soc. Am. 44(4), 330, (1954)).

To accomplish this, a sheet of synthetic paper sold by the company Arjo Wiggins Teape under the name Synteape is used.

Before being coated using a coating machine of the Hand Coater model KC202 type, this sheet of paper of dimension 26 cm×18 cm, and of specific weight 60 to 65 g/m², is weighed and then subjected to a light radiation of wavelength 457 nm on a black plate using an Elrepho™ 3000 spectrophotometer from Datacolor (Switzerland) to determine the reflectance factor $R_b$ of the uncoated paper on a black background.

The suspension for testing, formulated with a binder (12 parts styrene-acrylic binder (Acronal™ S360D) for 100 g dry weight of mineral load for testing) is then applied on this pre-weighed paper sheet using a coating machine of the Hand Coater model KC202 type.

The sheet of paper thus coated with different layer weights of between 5 and 50 g/m² is then subjected to light radiation of wavelength 457 nm using an Elrepho™ 3000 spectrophotometer from Datacolor (Switzerland) on a black plate to determine the reflectance factor of the paper on a black background $R_0$ and on a pile of at least 10 non-coated sheets of paper to determine the reflectance factor of the coated papers on a white background $R_1$, where r is the reflectance factor of the pile of uncoated sheets of paper.

The reflectance factor $R_{sc}$ of the layer alone, on a black background, is then determined using the following formula:

$$R_{sc} = \frac{R_1 \cdot R_b - R_0 \cdot r}{(R_1 - R_0) \cdot rR_b + R_b - r} \quad (1)$$

together with the transmission $T_{sc}$ of the layer $$T_{sc}^2 = \frac{(R_0 - R_{sc})(1 - R_{sc}R_b)}{R_b} \quad (2)$$

From these two quantities it is possible to calculate a theoretical reflectance value $R_\infty$ for a layer of infinite thickness given by the following formula:

$$\frac{1 - T_{sc}^2 + R_{sc}^2}{R_c} = \frac{1 + R_\infty^2}{R_\infty} \quad (3)$$

Thus, from this formula the light scattering factor S of the pigment under study may be calculated for each layer weight, given that, for a layer weight P, $$45 S.P. = \frac{1}{b} \coth^{-1} \frac{(1 - aR_{sc})}{bR_{sc}}$$

where $a = 0.5\left(\frac{1}{R_\infty} + R_\infty\right)$ and $b = 0.5\left(\frac{1}{R_\infty} - R_\infty\right)$ This light scattering factor S is traced according to the layer weight and the value S for a layer weight of 20 g/m² is determined by interpolation.

In the present case the value S obtained is 157 m²/g and is entirely comparable to the values obtained for suspensions of calcium carbonate of the prior art obtained according to the traditional means of thermal concentration.

In addition, the 75° C. TAPPI brilliancy of the sheet of paper previously coated is determined before calendering by passing the coated paper into the Lehmann™ laboratory glossmeter. For paper coated using the coating color containing the aqueous suspension of calcium carbonate of example 4 a 75° C. TAPPI brilliancy of 63.5 is obtained.

The coated paper is also calendered using a super-calendering machine with 9 areas of contact between the two rollers, sold by Kleinewefers.

The 75° C. TAPPI brilliancy is then 69.3.

The invention claimed is:

1. A process for the preparation of a concentrated cake comprising performing two separate stages of filtration, wherein in the first filtration stage, a pre-layer of mineral matter is formed on a filtration membrane in the absence of a dispersant agent, and in the second filtration stage, which is operated continuous to the first filtration stage, the pre-layer of mineral matter from the first filtration stage is treated on the filtration membrane with a second aqueous suspension containing a dispersant agent to obtain a filtrate and a concentrated cake, wherein the quantity of the dispersant agent in the filtrate is controlled and limited by a continuous measurement of the electrical conductivity of the filtrate, and wherein the second filtration stage is stopped as soon as the electrical conductivity of the filtrate increases.

2. The process of claim 1, wherein the second aqueous suspension contains mineral matter and the dispersant agent.

3. The process of claim 1, wherein the second aqueous suspension contains the dispersant agent but not mineral matter.

4. The process of claim 1, wherein the dispersant agent used in the second filtration stage is present between 0.01% and 10% by dry weight of dispersant relative to the dry weight of mineral matter filtered.

5. The process of claim 1, wherein the dispersant agent used in the second filtration stage is present between 0.1% and 2% by dry weight of dispersant relative to the dry weight of mineral matter filtered.

6. The process of claim 1, wherein the electrical conductivity is measured using an HI 8820N conductivity meter from Hanna Instruments (Portugal).

7. The process of claim 1, wherein the dispersant agent is sodium polyacrylate.

8. The process of claim 1, wherein the concentrated cake is subjected to compression.

9. The process of claim 1, wherein the concentrated cake is subjected to shearing.

10. The process of claim 1, wherein the mineral matter is natural calcium carbonate, chalk, calcite, marble, synthetic calcium carbonate, precipitated calcium carbonate, mixed carbonates of magnesium and calcium, dolomite, magnesium carbonate, zinc carbonate, lime, magnesia, barium sulphate, barita, calcium sulphate, silica, magnesio-silicate, talc, wollastonite, clay, alumino-silicate, kaolin, mica, metal or alkaline-earth oxides or hydroxides, magnesium hydroxide, iron oxide, zinc oxide, titanium oxide, titanium dioxide, or any mixtures thereof.

11. The process of claim 1, wherein the mineral matter is natural calcium carbonate, precipitated calcium carbonate, titanium dioxide, kaolin, aluminium hydroxide, clay or any mixtures thereof.

12. The process of claim 1, wherein the mineral matter is natural calcium carbonate.

13. The process of claim 1, wherein the mineral matter is precipitated calcium carbonate.

14. The process of claim 1, wherein the mineral matter is titanium dioxide.

15. The process of claim 14, wherein the titanium dioxide is in its anatase or rutile form.

16. The process of claim 1, wherein the mineral matter is kaolin.

17. The process of claim 1, wherein the mineral matter is aluminium hydroxide.

18. The process of claim 1, wherein the mineral matter is clay.

19. The process of claim 1, wherein an aqueous suspension of mineral matter is obtained from the concentrated cake.

20. The process of claim 19, wherein the aqueous suspension of mineral matter is obtained from shearing the concentrated cake.

21. The process of claim 1, wherein the filtrate obtained from the second filtration stage contains a near-zero quantity of dispersant.

* * * * *